(12) United States Patent
Dudney

(10) Patent No.: US 10,624,485 B2
(45) Date of Patent: Apr. 21, 2020

(54) VEGETABLE SKIN REMOVAL SYSTEM AND METHOD

(71) Applicant: Judith Ann Dudney, Penn Valley, CA (US)

(72) Inventor: Judith Ann Dudney, Penn Valley, CA (US)

( * ) Notice: Subject to any disclaimer, the term of this patent is extended or adjusted under 35 U.S.C. 154(b) by 212 days.

(21) Appl. No.: 15/620,763

(22) Filed: Jun. 12, 2017

(65) Prior Publication Data

US 2018/0352989 A1 Dec. 13, 2018

(51) Int. Cl.
*A47J 17/02* (2006.01)

(52) U.S. Cl.
CPC ..................... *A47J 17/02* (2013.01)

(58) Field of Classification Search
CPC ........................................... A47J 17/02
See application file for complete search history.

(56) References Cited

U.S. PATENT DOCUMENTS

| | | | | |
|---|---|---|---|---|
| 1,337,414 | A * | 4/1920 | Stanson | A47J 17/18 99/630 |
| 3,654,976 | A * | 4/1972 | Loeffler | A47J 17/18 99/623 |
| 4,306,133 | A * | 12/1981 | Levinson | H05B 6/6494 219/730 |
| 5,021,254 | A | 6/1991 | Fischer et al. | |
| 5,253,612 | A * | 10/1993 | Goetz | A01K 1/0245 119/496 |
| 5,414,248 | A * | 5/1995 | Phillips | B32B 27/12 219/730 |
| 5,771,792 | A | 6/1998 | Chen | |
| 5,986,248 | A * | 11/1999 | Matsuno | B65D 81/3453 219/728 |
| 6,131,508 | A | 10/2000 | Tsai | |
| 6,230,656 | B1 * | 5/2001 | Walach | A01K 1/0236 119/453 |
| 6,682,764 | B1 * | 1/2004 | Morris | B65D 81/3453 426/234 |
| 2002/0112674 | A1 * | 8/2002 | Lerner | A01K 1/0245 119/497 |
| 2006/0180421 | A1 * | 8/2006 | Godshaw | A01K 1/0254 190/18 A |
| 2007/0262182 | A1 * | 11/2007 | de Groote | A47J 19/04 241/169.1 |
| 2008/0072772 | A1 | 3/2008 | Haimoff et al. | |
| 2015/0208714 | A1 | 7/2015 | Ramos et al. | |
| 2017/0223924 | A1 * | 8/2017 | Grul | A01K 1/0114 |
| 2017/0280911 | A1 * | 10/2017 | Coyle | A47J 17/02 |
| 2018/0014502 | A1 * | 1/2018 | O'Shaughnessy | A01K 1/0245 |

* cited by examiner

*Primary Examiner* — Anthony J Weier
(74) *Attorney, Agent, or Firm* — Charles Runyan

(57) ABSTRACT

A vegetable skin removal system is shown herein, the vegetable having a volume, the system including a top-body, a bottom-body, a desiccant-tray configured to absorb and disperse moisture, the desiccant-tray removably insertable into the bottom-body, at least one hinge-assembly configured to hingedly couple the top-assembly to the bottom-assembly, and at least one fastener configured to secure the top-body to the bottom-body while the lower-mating-surface is mated with the top-mating-surface. The at least on hinge is preferably configured such that the top-body and the bottom-body are removable and/or separable from each other for cleaning and maintenance.

12 Claims, 5 Drawing Sheets

VEGETABLE SKIN REMOVAL SYSTEM AND METHOD

CROSS-REFERENCE TO RELATED APPLICATION(S)

The present application is related to and claims priority to U.S. Provisional Patent Application No. 62/348,856 filed Jun. 10, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of food and beverage apparatuses of existing art and more specifically relates to skim removal from food.

RELATED ART

There are many vegetables that require removal of an exterior skin or otherwise must be peeled before eating. One such example is garlic, where its "skin" called garlic sheath. Other vegetables that require peeling may include shallots, onions, potatoes, as well as others. Garlic (scientific name *Allium sativum*) is a species of edible plant from the *Allium* genus of monocotyledonous flowering plants. Garlic is widely used around the world for its pungent flavor for culinary use as a seasoning and/or as a condiment. Traditionally, the garlic's bulb (which may also be referred to as a 'head') is the most commonly sold part of the garlic plant, and with the exception of the single-clove types, and garlic bulbs are normally divided into many fleshy sections commonly referred to as cloves. The cloves may be processed in many ways; including pickling, dehydrating to a powder, grilling, sautéing, smoking, or other methods.

The inedible components of the garlic plant (or other vegetables) may include a skin covering. Garlic for example has a skin (garlic sheath) which covers each clove and root cluster. The skin is almost always discarded during the preparation for most uses. Methods for removing the skin include smashing and peeling the skin away, or driving the vegetable through a press to remove the skin. In some instances, vegetables may be available for purchase in a processed form, where the skin is removed at a processing facility. However, such processing generally reduces the usable life of the vegetable. Therefore it is desirable to remove vegetable skin just prior to the use of the vegetable. Some devices, including a vegetable press, may be available to aid a user in removing the skin prior to use. However, most such devices may often damage (e.g., crush, bruise, scrape, etc.) the vegetable such that the whole vegetable is not maintained. Therefore a suitable solution is desired.

U.S. Pat. Pub. No. 2008/0072772 to Simon Haimoff and Ofer Haimov relates to a garlic peeler. The described garlic peeler includes an appliance for peeling certain fruits and vegetables having a fine skin, and especially garlic, without abrading or breaking the garlic clove and without beating and scratching it, thus avoiding or minimizing damage to the garlic clove, so as to avoid or reduce dispersion of the typical garlic smell and to retain aesthetics and nutritive values thereof. It is provided a garlic clove peeler comprising a housing formed with a clove receiving compartment formed with a friction wall and a complimentary peeling element formed with a peeler surface extending adjacent the friction wall; and a displacement mechanism for displacing one or both of the friction wall and the peeling element.

SUMMARY OF THE INVENTION

In view of the foregoing disadvantages inherent in the known skin removal from food art, the present disclosure provides a novel vegetable skin removal system. The general purpose of the present disclosure, which will be described subsequently in greater detail, is to provide a vegetable skin removal system and method.

A system for removing skin from a vegetable is disclosed herein. The system for removing skin from a vegetable includes a top-body, a bottom-body, a desiccant-tray configured to support the vegetable and to absorb moisture, the desiccant-tray removably insertable into the bottom-body, a hinge-assembly configured to hingedly couple the top-assembly to the bottom-assembly, and a fastener configured to secure the top-body to the bottom-body while the lower-mating-surface is mated with the top-mating-surface. The top-body is shaped to form a top-cavity, the top-cavity is sized and dimensioned to enclose a part of the vegetable, the top-body includes a handle fixed to said top-body, a plurality of top-breathing-holes through said top-body and configured to let air pass, and a top-mating-surface. The bottom-body is shaped to form a bottom-cavity; the bottom-cavity is sized and dimensioned to enclose a rest of the vegetable not enclosed by the top-body, where together the top-cavity and the bottom-cavity have a total cavity volume greater than the vegetable volume. Further, the bottom-body includes a plurality of bottom-feet configured to support the bottom-body above a horizontal surface, a plurality of bottom-breathing-holes through said bottom-body and configured to let air pass, and a lower-mating-surface configured to mate with the top mating surface such that the vegetable is enclosed by the top-cavity and the bottom-cavity when the top-mating-surface and the bottom-mating-surface are mated.

According to another embodiment, a method of removing skin from a vegetable is also disclosed herein. The method includes a first step of providing a vegetable skin removal system (including a top-body, a bottom-body, a desiccant-tray, a hinge-assembly, and at least one fastener, the a top-body and the bottom-body together forming a cavity); a second step of placing the vegetable into the cavity of the top-body and the bottom-body (with the desiccant tray removed); a third step of fastening the top-body to the bottom-body via the at least one fastener; a fourth step of shaking the vegetable skin removal system until skin is removed from the vegetable; a fifth step of unfastening the top-body from the bottom-body; and a sixth step of removing the vegetable from the vegetable skin removal system.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a vegetable skin removal system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a device for skin removal from food and more particularly to a vegetable skin removal system as used to improve the removal of skin from vegetables while providing a device with improved aesthetics.

Generally, the vegetable skin removal system serves as a functional device as well as an artistic piece to add to kitchen decorations. The system may be uniquely shaped like a head of garlic, such as an elephant garlic head, while integrating functional features. For example, the stem may be configured as a handle, and at least three clove-shaped members extending from the bottom and configured as support for the system. Further, the system may include functional features such as holes on the top and bottom that are configured to allow air flow to pass in and out of an inner volume or cavity. Likewise, the system may include clasps on the front side, for example, which are simple and allow the top to stay secured to the bottom, and on the back side, there may be at least one corresponding hinge.

The present disclosure provides a cavity to store garlic in, further the cavity may be sufficiently oversized to allow garlic cloves to travel a distance of at least twice their length within the cavity when shaken or otherwise agitated. On the bottom half of the system may include a loose tray made of a material having desiccant properties (e.g., clay, etc.), which can be easily removed (for example during shaking, cleaning, etc.) and returned to the cavity, for example, to collect 'sweat' from the garlic in the event that the garlic is stored within the invention for an extended period of time. The breathing holes on the bottom may be positioned just above the tray or otherwise arranged to increase ventilation. The final aesthetic touches are the "roots" (i.e., irregularities in the in the bottom that are sculpted in and having a general appearance of roots of a garlic bulb), which may aid in gripping the system while shaking to remove garlic sheaths.

Referring now more specifically to the drawings by numerals of reference, there is shown in FIGS. 1-4, various views of a vegetable skin removal system 100.

Figure 1:
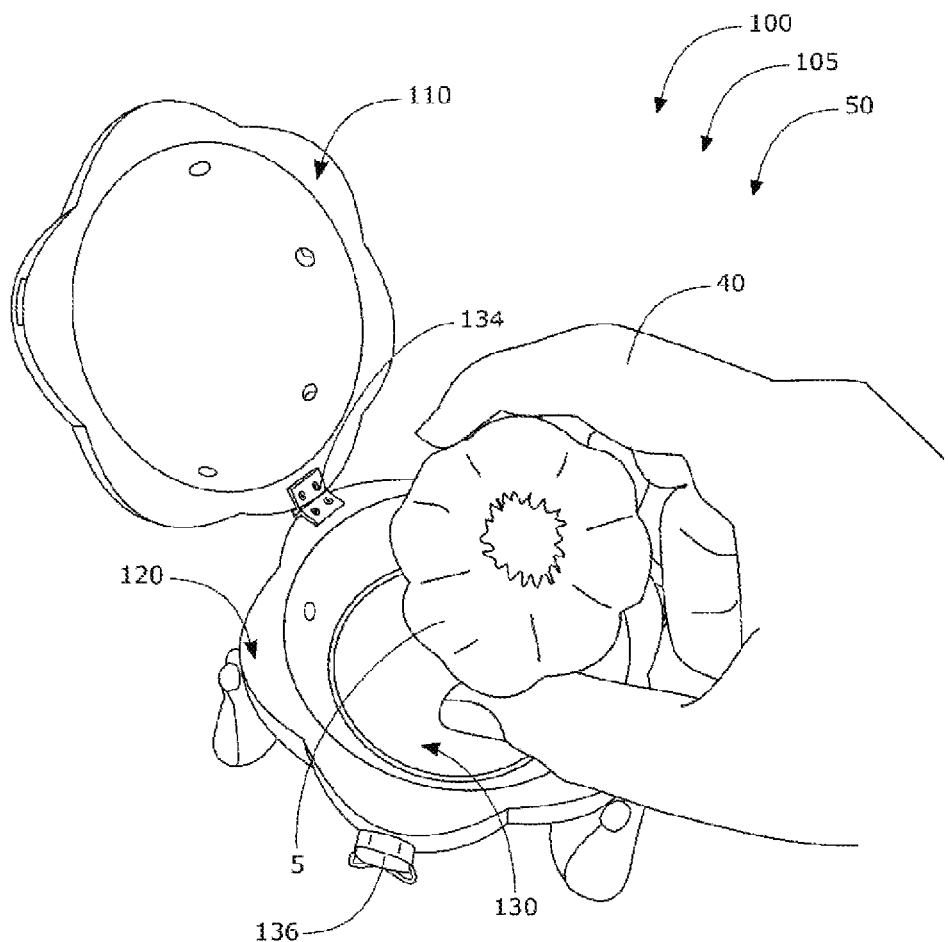
FIG. 1 is a perspective view of the vegetable skin removal system during an 'in-use' condition, according to an embodiment of the disclosure.

FIG. 1 shows a vegetable skin removal system 100 during an 'in-use' condition 50, according to an embodiment of the present disclosure. Here, the vegetable skin removal system 100 may be beneficial for use by user 40 to store, contain, and/or remove skins from vegetable 5. As illustrated, the vegetable skin removal system 100 may include a top-body 110, a bottom-body 120, a desiccant-tray 130, at least one hinge-assembly 134, and at least one fastener 136.

According to one embodiment, the vegetable skin removal system 100 may be arranged as a kit 105. In particular, the vegetable skin removal system 100 may further include a set of instructions 107. The instructions 107 may detail functional relationships in relation to the structure of the vegetable skin removal system 100 such that the vegetable skin removal system 100 can be used, maintained, or the like, in a preferred manner.

In embodiments, vegetable 5 may include a wide variety of different types of vegetable(s) 5 including, but not limited to a head or clove(s) of garlic, one or more shallots, one or more onions of various sizes, and/or potatoes of various sizes. As such, vegetable skin removal system 100 may be sized according to the specific vegetable 5 to be peeled, in various embodiments.

The construction of vegetable skin removal system 100 may include many different types of materials or combinations of materials, in various embodiments. For example, the top-body 110 and/or the bottom-body 120 may be constructed from a plastic material for sterility and longevity during use. Also, the top-body 110 and/or the bottom-body 120 may be constructed from a ceramic material for hardness and moisture retention. Additionally, the top-body 110 and/or the bottom-body 120 may be constructed from a metallic material for durability. Other materials may be used, or combined, depending upon specific uses and user 40 requirements. According to a preferred embodiment, the top-body 110 and/or the bottom-body 120 may be configured to peel a garlic sheath from a garlic clove via agitation of the top-body and the bottom-body while the garlic is closed inside a cavity formed by the top-body and the bottom-body, as such the top-body 110 and/or the bottom-body 120 may be made of a hard material such as ceramic, metal, etc.

Figure 2:
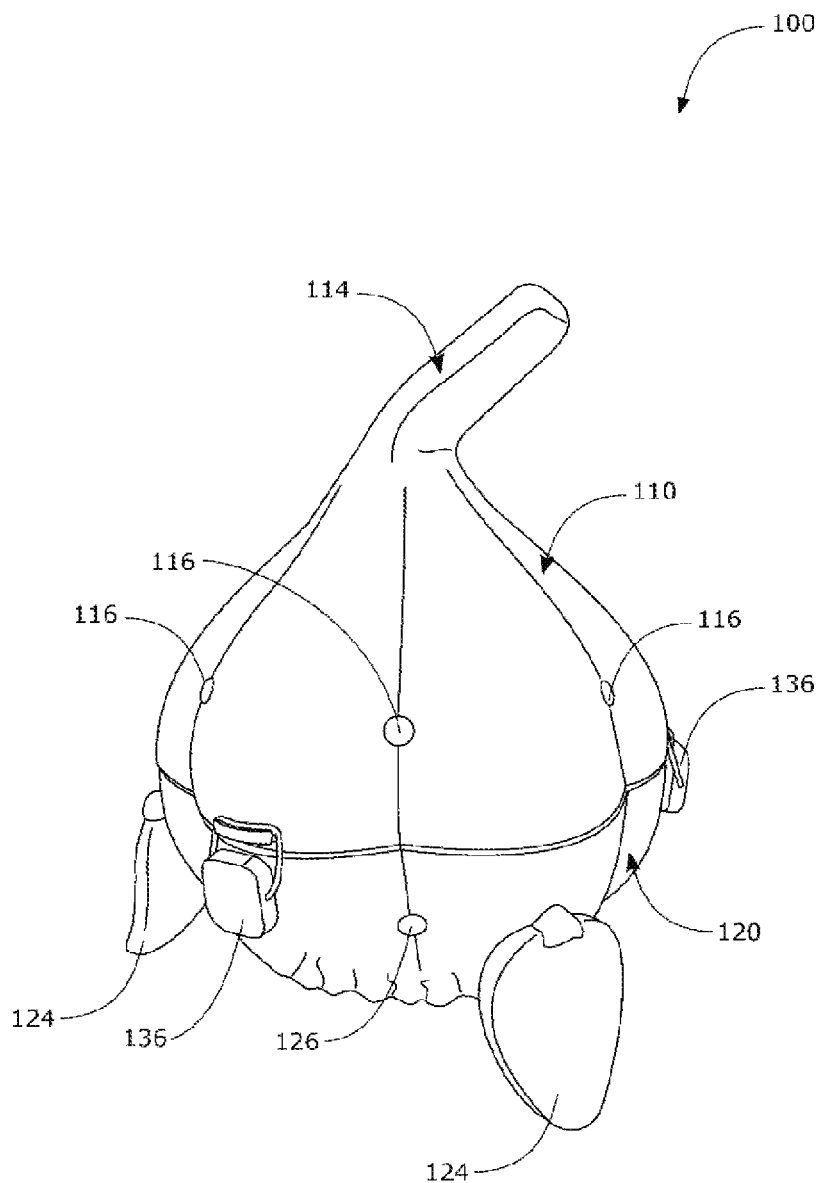
FIG. 2 is a front-perspective view of the vegetable skin removal system of FIG. 1, according to an embodiment of the present disclosure.

FIG. 2 shows vegetable skin removal system of FIG. 1, according to an embodiment of the present disclosure. As above, the vegetable skin removal system 100 may include the top-body 110 and the bottom-body 120. The top-body 110 may include a top-mating surface 118 (FIG. 4), a plurality of top-breathing holes 116, and a handle 114. The bottom-body 120 may include a lower-mating-surface 128 (FIG. 4), a plurality of bottom-breathing-holes 126, and a plurality of bottom-feet 124. The lower-mating-surface 128 may be configured to mated or otherwise closingly couple with the top-mating surface 118.

The vegetable skin removal system 100 may include at least one fastener 136 configured to secure top-body 110 to bottom-body 120 and an associated hinge-assembly 134 configured to hingedly couple top-assembly 110 to bottom-assembly 120. As illustrated, the system 100 may be configured to include a plurality of fasteners 136. According to one embodiment, the hinge may be separable or otherwise configured such that top-body 110 and bottom-body 120 may be removable from each other for cleaning and/or maintenance, for example.

Figure 3:
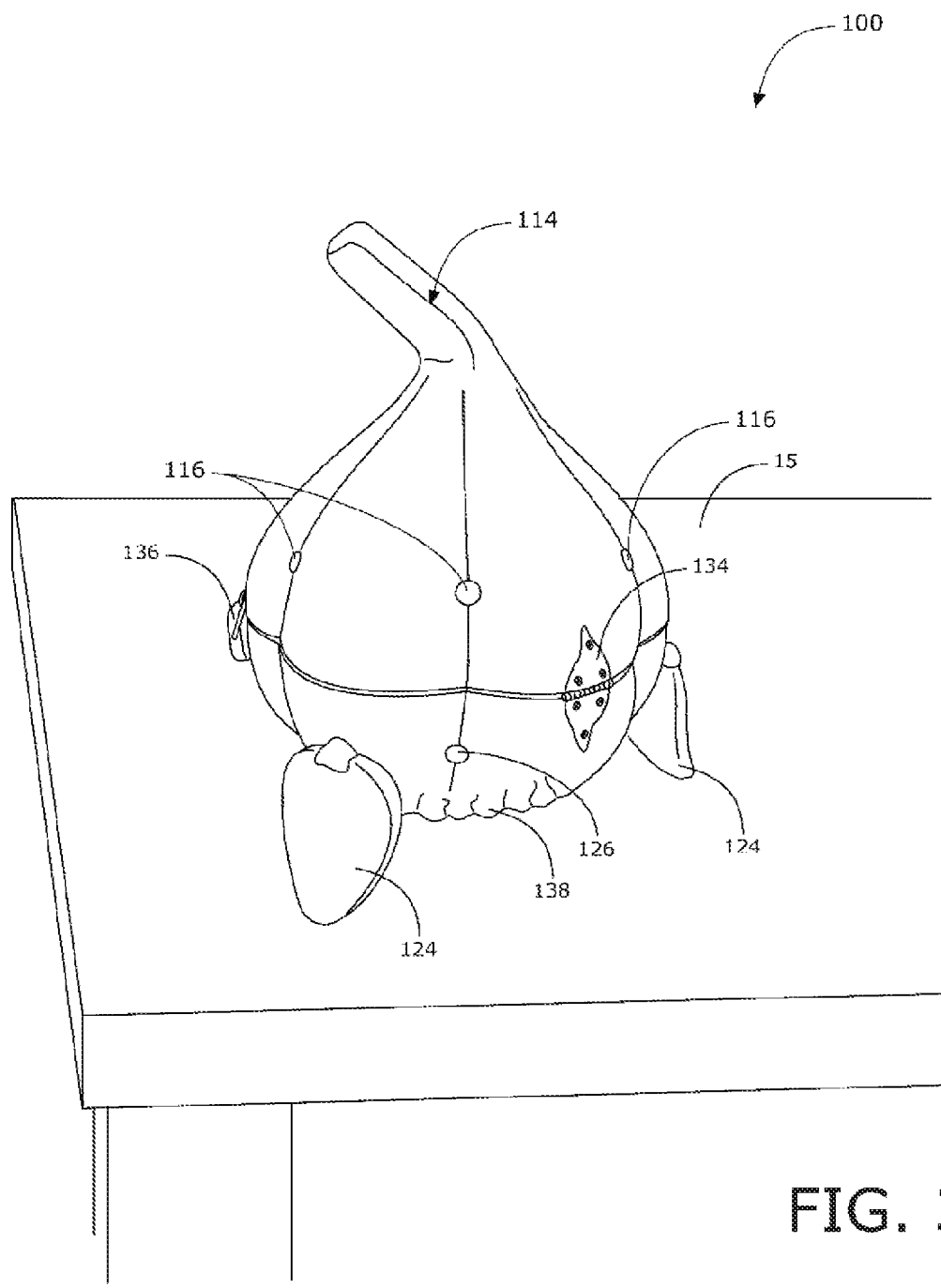
FIG. 3 is a rear-perspective view of the vegetable skin removal system of FIG. 1, according to an embodiment of the present disclosure.
Figure 4:
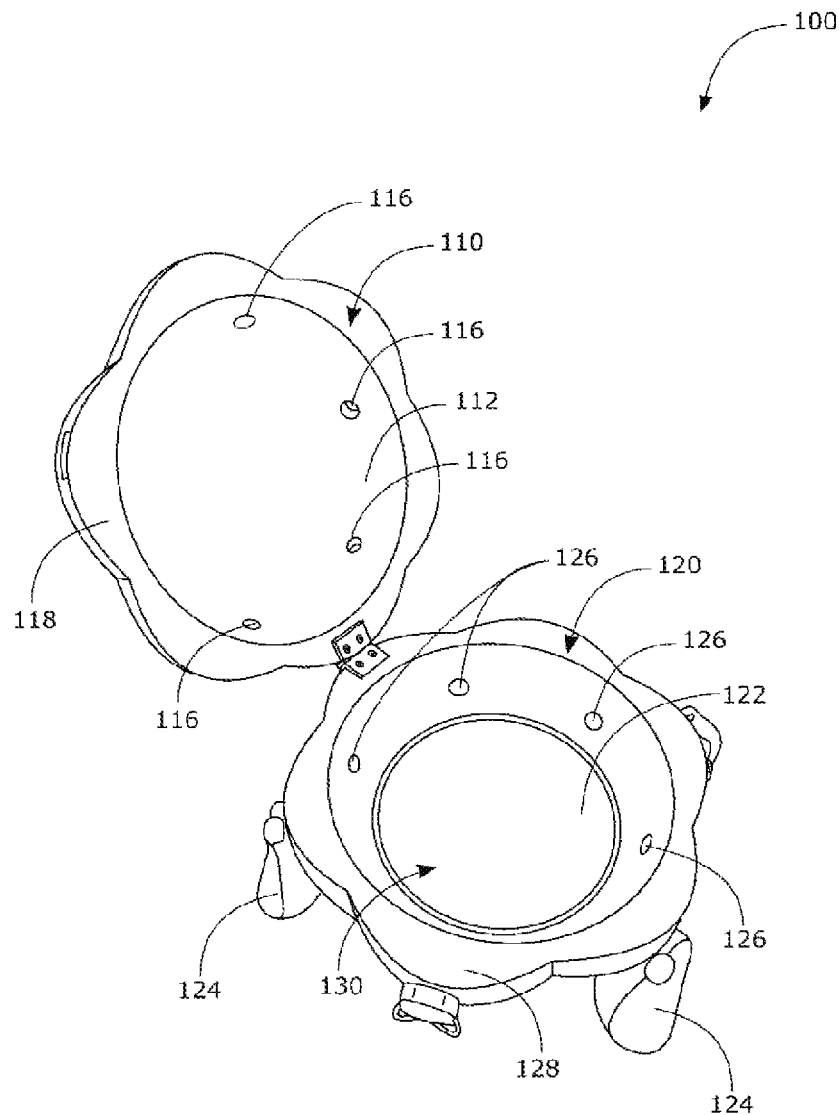
FIG. 4 is a perspective view of the vegetable skin removal system of FIG. 1, according to an embodiment of the present disclosure.

FIG. 3 is a front-perspective view of the vegetable skin removal system in a closed arrangement, and FIG. 4 is a perspective view of the vegetable skin removal system in an open arrangement. As shown in the open arrangement, the top-body 110 may be shaped to form a top-cavity 112 and the bottom-body 120 may be shaped to form a bottom-cavity 122. Together the top-cavity 112 and the bottom-cavity 122 may be sized and dimension to enclose the vegetable 5 (FIG. 1) or in other words, the top-cavity 112 and bottom-cavity 122 may have a total cavity volume greater than vegetable(s) 5. Further, the top-cavity 112 and the bottom-cavity 122 may be oversized and dimensioned to enclose the vegetable 5 (or a plurality of vegetables 5) and to provide ample free space for the vegetable to travel during shaking (e.g., at least twice a characteristic length of the vegetable). For example, the top-cavity 112 and the bottom-cavity 122 may have an aggregate volume of between 0.2 L to 2.0 L.

According to one embodiment, the top-cavity 112 may be sized and dimension to enclose a part of vegetable 5, and the bottom-cavity 122 may be sized and dimensioned to enclose the remainder of vegetable 5 not enclosed by top-body 110. It should be understood that, as the vegetable 5 may include a plurality of the vegetable 5 and the aggregate cavity may be sized and dimensioned for free travel of the vegetable(s) 5 (e.g., during shaking removal of garlic sheaths), the top-cavity 112 and the bottom-cavity 122 may be may be sufficiently voluminous to enclose the entire vegetable(s) 5.

As above, the top-body 110 may include the handle 114 fixed to top-body 110, a plurality of top-breathing-holes 116 through the top-body 110 configured to pass air there through, and the top-mating-surface 118. According to one embodiment and as shown, the handle 114 may be configured as a stem or cut stalk.

As above, the bottom-body 120 may include a plurality of bottom-feet 124 configured to support bottom-body 120 above horizontal surface 15, a plurality of bottom-breathing-holes 126 through bottom-body 120 configured to pass air there through, and lower-mating-surface 128 configured to mate with the top-mating-surface such that vegetable 5 may be enclosed by the volume created by top-cavity 112 and bottom-cavity 122 when top-mating-surface 118 and bottom-mating-surface 128 are securely mated. Thus the lower-mating-surface 128 may be configured to mated or otherwise closingly couple with the top-mating surface 118.

According to one embodiment, the bottom-assembly 120 may also include a root-assembly 138 configured to provide stability to vegetable peeling system 100 during use and improve aesthetics. In particular, the root-assembly 138 may include an irregular shaped gripping area on a lower portion of the bottom assembly, which may aid in gripping the system 100 while shaking to remove garlic sheaths. Further, the irregularities in the in the bottom the root-assembly 138 may be sculpted in (or otherwise integrated with the bottom-assembly 120) so as to have a general appearance of "roots" of a garlic bulb, or other aesthetic designs.

According to one embodiment, a plurality of bottom-feet 124 of the bottom-assembly 120 may also may also be configured to provide stability to vegetable peeling system 100 during use and improve aesthetics. In particular, the plurality of bottom-feet 124 may include at least three clove-shaped members extending from the bottom and configured as support system for the system 100.

According to one embodiment, the top-mating-surface 118 may further include a deformable gasket (not shown) made of a deformable material and configured seal the top-body 110 to the bottom-body 120 when top-body 110 and the bottom-body 120 are mated. Similarly and/or alternatively, bottom-mating-surface 128 may further include a similar deformable gasket made of a deformable material and configured seal the top-body 110 to the bottom-body 120 when top-body 110 and bottom-body 120 are mated.

Also shown in FIG. 4 is the desiccant-tray 130 configured to absorb or collect and disperse moisture. The desiccant-tray 130 may be removably insertable into bottom-body 120. The desiccant-tray 130 may be configured to support the vegetable(s) 5, when enclosed in the top-body 110 and the bottom-body 120. According to one embodiment, the desiccant-tray 130 may be configured to be removed during removal of the skin of the vegetable 5.

Additional features may be included in vegetable skin removal system 100 to facilitate the removal of vegetable skin. For example, a top-interior-surface of top-body 110 may include cutting edges fixed thereto and configured to assist removal of the vegetable skin. Similarly, a bottom-interior-surface of bottom-body 120 may also include cutting edges fixed thereto and configured to assist removal of the vegetable skin. Alternately, or in addition, the top-interior-surface of top-body 110 may include irregularities fixed thereto and configured to assist removal of the vegetable skin, and the bottom-interior-surface of bottom-body 120 may include irregularities fixed thereto and configured to assist removal of the vegetable skin.

Figure 5:
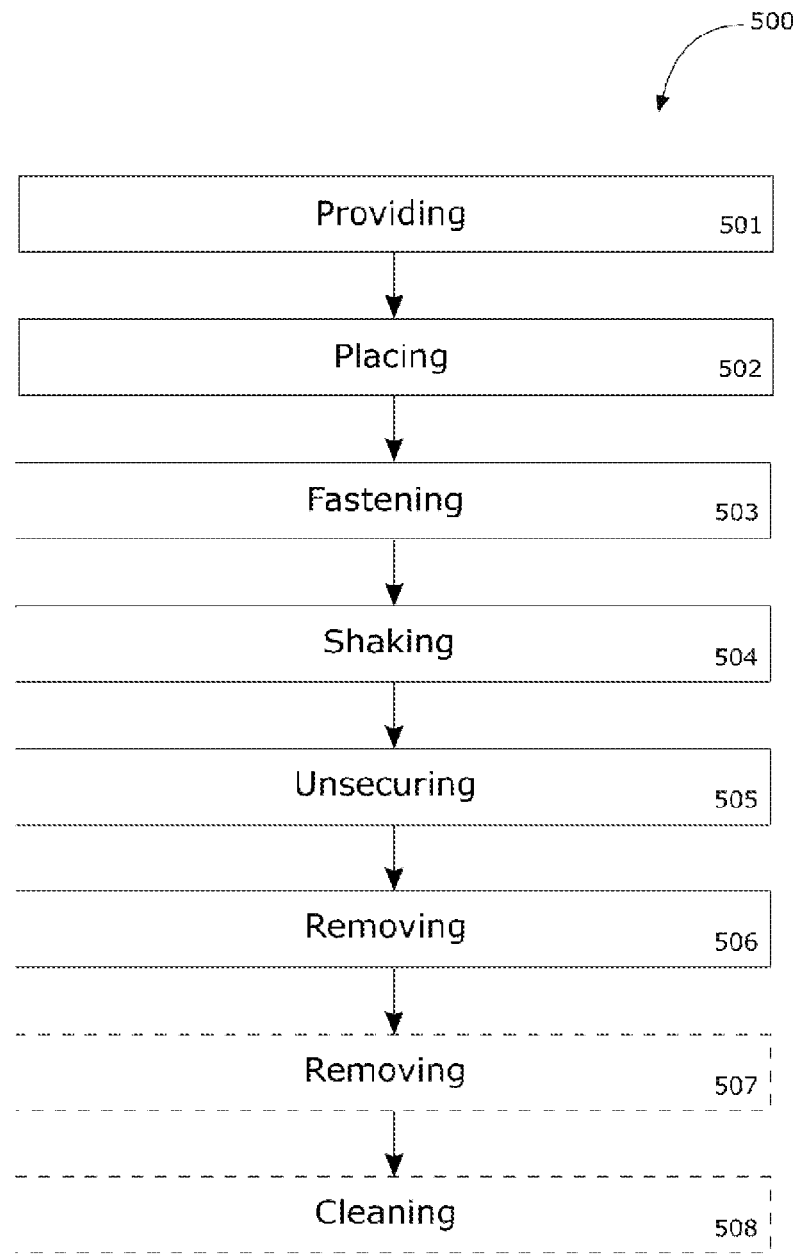
FIG. 5 is a flow diagram illustrating a method of using a vegetable skin removal system, according to an embodiment of the present disclosure.

FIG. 5 is a flow diagram illustrating method of removing skin from a vegetable or using a vegetable skin removal system 500, according to an embodiment of the present disclosure. In particular, method of using a vegetable skin removal system 500 may include one or more components or features of vegetable skin removal system 100 as described above. As illustrated, method of using a vegetable skin removal system 500 may include the steps of: step one 501, providing a vegetable skin removal system 100 including top-body 110, bottom-body 120, desiccant-tray 130, at least one hinge-assembly 134, and at least one fastener, the a top-body and the bottom-body together forming a cavity (with desiccant-tray 130 removed for future use); step two 502, placing a vegetable 5 insertable into the cavity of the top-body 110 and the bottom-body 120; step three 503, fastening the top-body 110 to the bottom-body 120 together via at least one fastener 136; step four 504, shaking vegetable skin removal system 100 until skin is removed from the from vegetable 5; step five 505, unfastening the top-body 110 from the bottom-body 120; step six 506, removing vegetable 5 from the vegetable skin removal system 100. According to one embodiment, the method of using a vegetable skin removal system 500 may further include the steps of: step seven 507, removing the skin that was removed from vegetable 5 via vegetable skin removal system 100; and step eight 508, cleaning vegetable skin removal system 100 (enumerated components, elements, and features are shown in FIGS. 1-4).

It should be noted that step seven 507 and step eight 508 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using a vegetable skin removal system (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A system for removing skin from a vegetable, the vegetable having a volume, the system comprising:
    a top-body, said top-body shaped to form a top-cavity, said top-cavity sized and dimensioned to enclose a part of the vegetable, said top-body including a handle fixed to said top-body, a plurality of top-breathing-holes through said top-body and configured to let air pass, and a top-mating-surface;
    a bottom-body, said bottom-body shaped to form a bottom-cavity, said bottom-cavity sized and dimensioned to enclose a rest of the vegetable not enclosed by the top-body, where together the top-cavity and the bottom-cavity have a total cavity volume greater than the vegetable volume, the bottom-body including a plurality of bottom-feet configured to support the bottom-body above a horizontal surface, a plurality of bottom-breathing-holes through said bottom-body and configured to let air pass, and a lower-mating-surface configured to mate with the top mating surface such that the vegetable is enclosed by the top-cavity and the bottom-cavity when the top-mating-surface and the bottom-mating-surface are mated;
    a desiccant-tray configured to support the vegetable and to absorb moisture, the desiccant-tray removably insertable into the bottom-body;
    a hinge-assembly configured to hingedly couple the top-assembly to the bottom-assembly; and
    a fastener configured to secure the top-body to the bottom-body while the lower-mating-surface is mated with the top-mating-surface,
    wherein the top-body includes a top-interior-surface having a first plurality of cutting edges fixed thereto and configured to assist removal of the vegetable skin.

2. The system of claim 1, wherein the bottom-body includes a bottom-interior-surface having a second plurality of cutting edges fixed thereto and configured to assist removal of the vegetable skin.

3. The system of claim 1, wherein the vegetable is garlic.

4. The system of claim 1, wherein the top-body and the bottom body together are shaped as a head of garlic; and wherein the handle fixed of the top-body is shaped as a cut stem of the head of garlic.

5. The system of claim 1, wherein the plurality of bottom-feet of the bottom-body are each shaped as a clove of garlic.

6. The system of claim 1, wherein the skin of the vegetable includes a garlic sheath of the garlic; and
    wherein the top-cavity of the top-body and the bottom-cavity of the bottom-body are configured to peel the garlic sheath from the garlic via agitation of the top-body and the bottom-body while the garlic is closed inside the top-cavity of the top-body and the bottom-cavity of the bottom-body.

7. The system of claim 1, wherein the vegetable is of the *Allium* genus of monocotyledonous flowering plants.

8. The system of claim 1, wherein the at least one hinge is separable such that the top-body and the bottom-body are separable and recoupleable.

9. A system for removing skin from a vegetable, the vegetable having a volume, the system comprising:
    a top-body, said top-body shaped to form a top-cavity, said top-cavity sized and dimensioned to enclose a part of the vegetable, said top-body including a handle fixed to said top-body, a plurality of top-breathing-holes through said top-body and configured to let air pass, and a top-mating-surface;
    a bottom-body, said bottom-body shaped to form a bottom-cavity, said bottom-cavity sized and dimensioned to enclose a rest of the vegetable not enclosed by the top-body, where together the top-cavity and the bottom-cavity have a total cavity volume greater than the vegetable volume, the bottom-body including a plurality of bottom-feet configured to support the bottom-body above a horizontal surface, a plurality of bottom-breathing-holes through said bottom-body and configured to let air pass, and a lower-mating-surface configured to mate with the top mating surface such that the vegetable is enclosed by the top-cavity and the bottom-cavity when the top-mating-surface and the bottom-mating-surface are mated;
    a desiccant-tray configured to support the vegetable and to absorb moisture, the desiccant-tray removably insertable into the bottom-body;
    a hinge-assembly configured to hingedly couple the top-assembly to the bottom-assembly; and
    a fastener configured to secure the top-body to the bottom-body while the lower-mating-surface is mated with the top-mating-surface,
    wherein the top-body and the bottom-body are each made of a ceramic material.

10. The system of claim 1, wherein the top-body and the bottom-body are each made of a metallic material.

11. A method of removing skin from a vegetable, the method comprising the steps of:
    providing a vegetable skin removal system including a top-body, a bottom-body, a desiccant-tray, at least one hinge assembly, and at least one fastener, the a top-body and the bottom-body together forming a cavity;
    placing the vegetable into the cavity of the top-body and the bottom-body;
    fastening the top-body to the bottom-body via the at least one fastener;
    shaking the vegetable skin removal system until skin is removed from the vegetable;
    unfastening the top-body from the bottom-body;
    removing the vegetable from the vegetable skin removal system.

12. The method of claim 11, further comprising the steps of:
    removing the skin that was removed from the vegetable via the vegetable skin removal system; and
    cleaning the vegetable skin removal system.

* * * * *